(12) United States Patent
Oh et al.

(10) Patent No.: US 7,066,301 B2
(45) Date of Patent: Jun. 27, 2006

(54) LINEAR ACTUATOR HAVING MANUAL OVERRIDE AND LOCKING MECHANISM

(75) Inventors: Michael Hung-Sun Oh, Rockford, IL (US); Gerald R. Parsons, Caledonia, IL (US)

(73) Assignee: Invensys Building Systems, Inc., Loves Park, IL (US)

( * ) Notice: Subject to any disclaimer, the term of this patent is extended or adjusted under 35 U.S.C. 154(b) by 208 days.

(21) Appl. No.: 10/636,123

(22) Filed: Aug. 7, 2003

(65) Prior Publication Data

US 2004/0026175 A1 Feb. 12, 2004

Related U.S. Application Data

(63) Continuation-in-part of application No. 10/101,681, filed on Mar. 20, 2002, now Pat. No. 6,725,976.

(51) Int. Cl.
*F03G 01/00* (2006.01)

(52) U.S. Cl. .............. 185/40 R; 185/40 B; 185/39; 185/11

(58) Field of Classification Search .......... 185/40 B, 185/40 R, 39, 37, 38, 9, 10, 11; 137/556, 137/15.01
See application file for complete search history.

(56) References Cited

U.S. PATENT DOCUMENTS 4,333,489 A * 6/1982 Magill et al. ............... 137/77
4,416,611 A * 11/1983 Zivny ......................... 431/20
4,545,363 A * 10/1985 Barchechat et al. ..... 126/285 B
4,581,987 A    4/1986 Ulicny
4,595,081 A    6/1986 Parsons
5,310,021 A    5/1994 Hightower
5,529,282 A    6/1996 Lebkuchner
5,758,684 A * 6/1998 Hudson et al. ............. 137/269
5,988,319 A * 11/1999 Hudson et al. ........... 185/40 R
6,725,976 B1 * 4/2004 Oh et al. .................. 185/40 B

FOREIGN PATENT DOCUMENTS

EP     0 903 522 A2    3/1999

* cited by examiner

*Primary Examiner*—David M. Fenstermacher
(74) *Attorney, Agent, or Firm*—Leydig, Voit & Mayer, Ltd.

(57) ABSTRACT

A manual override mechanism is presented for a motor-driven linear actuator that allows the output rack and pinion of the actuator to be manually positioned. Once positioned, the output may be locked by a locking mechanism to prevent this output from translating to its quiescent position. When incorporated in a spring-return linear actuator, the manual override may be used to apply a preload on the spring before the driven device is connected. When the actuator is used to drive a valve or damper, the preload applies a positive closing force on the valve or damper in its zero position to ensure a tight closure of the valve or damper. The locking mechanism engages the gear train and opposes the closing force applied by the spring return of the actuator. To disengage the locking mechanism automatically, the motor applies a forward kick to the gear train. Manual disengagement is also provided.

20 Claims, 6 Drawing Sheets

LINEAR ACTUATOR HAVING MANUAL OVERRIDE AND LOCKING MECHANISM

CROSS REFERENCE TO RELATED APPLICATION

This patent application is a continuation-in-part of application Ser. No. 10/101,681, filed Mar. 20, 2002 now U.S. Pat. No. 6,725,976 for a Manual Override and Locking Mechanism and Actuator Including Same, the teachings and disclosure of which are incorporated herein in their entireties by reference thereto.

FIELD OF THE INVENTION

The present invention relates generally to linear actuators, and more particularly to motor driven reversible linear actuator mechanisms that allow the manual override and position setting of the motor driven reversible linear actuator mechanisms.

BACKGROUND OF THE INVENTION

Motor driven actuator mechanisms for use in controlling the position of valves, dampers, etc. typically include a motor that drives an output coupling in one direction through a gear train to position the valve, damper, etc. in a desired position. Spring type or fail-safe actuator mechanisms also typically include a clock spring coupled to the gear train that is wound during energization of the motor. In this way, energy for rotating the shaft in the other direction when the motor is de-energized is stored in the spring. Upon loss of power to the motor, the clock spring unwinds, driving the gear train to position the valve, damper, etc. in a desired or fail-safe position.

Such mechanisms for rotary actuators are described in U.S. Pat. No. 5,310,021, entitled Motor-Driven, Spring-Returned Rotary Actuator and U.S. Pat. No. 4,595,081 entitled Reversible Rotary Actuator With Spring Return, both of which are assigned to the assignee of the instant application, the teachings and disclosures of which are incorporated in their entireties herein by reference thereto. Another type of spring return system for a linear actuator having particular applicability to drive a valve is described in U.S. Pat. No. 5,529,282, entitled Valve Actuating Device of a Heating and/or Cooling System.

In the rotary-type actuators the motor rotates the output shaft and winds the spring by way of a gear train which substantially reduces the speed and substantially amplifies the torque of the motor. When the spring unwinds to rotate the output shaft, the spring acts reversely through the gear train and backdrives the motor shaft. An actuator of this type is frequently used to drive a utilization device such as a damper in the duct of a heating, ventilating and cooling system. When the motor is de-energized, the spring drives the output shaft in a direction moving the damper to a closed position against a fixed stop. The effectiveness of the seal of the damper against this fixed stop is somewhat a function of the amount of spring force remaining in the clock spring when the damper encounters the stop. If this position is reached when the spring has released all of its stored energy, the quality of the seal against the stop is determined solely on the quiescent mechanical contact between these two surfaces, taking into account the mechanical connection to the motor through the gear train.

While such contact between the damper and the fixed stop may be adequate to stop flow through the damper for many installations, certain installations may require that the seal between the damper and the stop be positively held. That is, there are some installations that require that the damper be able to remain positively closed with increased pressure. Such positive closing force against the fixed stop is particularly desirable in higher pressure installations and in valve operations. Indeed, nearly all installations could benefit from such a positive closing force imparted by the spring to ensure the integrity of the closed position.

To provide such a positive closing force on the damper, valve, etc. driven by the spring return actuator, the output coupling of the actuator is often rotated a few degrees before being connected to the drive shaft of the driven device (e.g., damper, valve, etc.). Such rotation of the output coupling winds the spring to establish a preload. Once a spring preload is established, the output coupling of the actuator is connected to the drive shaft of the driven device that is positioned in its closed or fail-safe position (referred to herein as the zero position). Once connected, the spring imparts the positive preload force on the driven device at its zero position.

Unfortunately, since the output coupling of the actuator is coupled through a torque multiplying gear train, rotation of this output coupling by hand is somewhat difficult. Further, since the return spring also acts through the torque multiplying gear train, holding the output coupling at the preload position while trying to connect this output coupling to the drive shaft of the driven device is also quite difficult.

In the linear-type actuators used to control valve opening and closing, such as that described in U.S. Pat. No. 5,529,282, an output rack is driven by an output pinion gear coupled directly to a motor shaft. When the motor is energized, it rotates the pinion gear in a direction to linearly translate the output rack away from the valve stem. This linear translation also extends two rack bias springs. With the rack withdrawn, a valve stem biasing spring within the valve is then able to expand to open the valve. When the motor is de-energized, the two linear rack biasing springs contract to force the rack against the valve stem. The force of the two rack bias springs is sufficient to overcome the valve stem bias spring, thereby closing the valve.

Unfortunately, once the valve actuator is positioned on the valve body, there is no way to add or otherwise vary a preload on the valve stem. Further, since the rack bias springs are linear springs, a preload force can only be applied by linearly extending the springs, i.e. by linearly translating the rack by repositioning the actuator relative to the valve body. However, this directly reduces the amount of linear travel of the rack that can occur during operation of the valve. Depending on the preload force required, this may result in failure of the valve to open fully because the rack cannot be linearly translated beyond its stop.

There exists, therefore, a need in the art for a linear actuator that includes that ability to apply and adjust a preload force without reducing the linear travel of the output rack, and that provides a manual lockout to enable installation of the linear actuator without difficulty.

BRIEF SUMMARY OF THE INVENTION

In view of the above, the present invention is directed to a new and improved spring return linear actuator that includes a manual override that allows the imparting of a preload on the return spring in a simple and effective manner. Further, the invention is directed to a new and improved spring return linear actuator having such a manual override that includes a locking mechanism capable of locking the output coupling from linearly translating under influence of the return spring.

A linear actuator in accordance with one embodiment of the present invention comprises a motor, a gear train, an output pinion gear driven by the motor through the gear train, and an output rack driven by the pinion gear. The rack may include an output coupling to attach to the valve stem to positively drive the valve open and close, or may simply have an output drive end for use with a spring return-type valve. The gear train multiplies the torque of the motor to linearly translate the output rack. A manual override mechanism having a user accessible interface is also included. The manual override mechanism operates in conjunction with the gear train to allow manual positioning of the output rack. Further, a manual locking mechanism having a user accessible interface is also included. This manual locking mechanism engages the gear train to prevent rotation of the output pinion in a first rotary direction and linear translation of the rack in a first linear direction.

Preferably, the actuator further comprises a spring return mechanism including a clock spring coupled to the gear train. This clock spring is wound upon energization of the motor driving the output pinion in a second rotary direction and the output rack in a second linear direction. The clock spring is unwound upon de-energization of the motor to drive the output pinion through a portion of the drive train in the first rotary direction, which linearly translates the rack in the first linear direction. The manual override mechanism is coupled through the clock spring such that operation of the manual override to effect a rotation of the output pinion in the second rotary direction and to effect a linear translation of the output rack in the second linear direction winds the clock spring.

In a preferred embodiment the manual locking mechanism includes a segment gear head having a toothed portion and a smooth portion on its face. The segment gear head is rotatable between a locked position wherein the toothed portion engages the gear train preventing rotation of the output pinion in the first rotary direction and linear translation of the output rack in the first linear direction, and an unlocked position wherein the smooth portion is positioned in association with the gear train and the toothed portion is disengaged from the gear train.

Further, the manual locking mechanism preferably includes a reset lock spring operatively coupled to the segment gear head to bias the segment gear head to the unlocked position. The segment gear head also includes a slot adapted to accommodate a stop pin. This stop pin abuts against a first end of the slot in the unlocked position and against a second end of the slot in the locked position. Rotation at a point of engagement with the locking mechanism of the gear train under influence of the clock spring is in a direction to rotate the segment gear head against the reset lock spring force. This maintains the manual locking mechanism in the locked position. Rotation at a point of engagement with the locking mechanism of the gear train under influence of the motor is in a direction to rotate the segment gear head in accord with the reset lock spring force. This aids the manual locking mechanism to achieve the unlocked position. Preferably, the motor drives the output pinion in a second rotary direction and the output rack in a second linear direction to disengage the locking mechanism from the gear train to allow rotation of the output pinion in the first rotary direction and to allow linear translation of the output rack in the first linear direction.

In an alternate embodiment of the present invention, a locking mechanism for a motor driven linear actuator having a gear train drivably coupling a motor to an output rack and pinion to drive a device is provided. This locking mechanism comprises a segment gear head having a toothed portion and a smooth portion on its face. The toothed portion is configured to engage a gear in the gear train. The segment gear head is positioned in relation to the gear such that rotation of the segment gear head between a locked position and an unlocked position results in engagement of the toothed portion with the gear in the locked position and disengagement of the toothed portion in the unlocked position. The segment gear head further includes a slot adapted to accommodate a stop pin, and is positioned in the segment gear head such that the stop pin abuts against a first end of the slot in the unlocked position and against a second end of the slot in the locked position. A reset lock spring is operably coupled to the segment gear head to bias the segment gear head to the unlocked position. Further, a user interface is coupled to the segment gear head to rotate the segment gear head between the locked and the unlocked positions.

In a preferred embodiment the toothed portion of the segment gear head occupies approximately 25°. Further, the toothed portion is preferably positioned in relation to the slot such that rotation of the gear train at a point of engagement with the locking mechanism is in a direction to rotate the segment gear head such that the stop pin engages the second end. Additionally, the reset lock spring preferably is positioned such that engagement of the toothed portion of the segment gear head with the gear train when the actuator is driving the device to a closed position results in rotation of the segment gear head against the bias applied by the reset lock spring.

In yet a further alternate embodiment of the present invention, a spring return, motor driven linear actuator for driving a flow control device to an open position under power and to a closed position upon loss of power is presented. This actuator comprises a motor, a speed reducing, torque multiplying gear train drivingly coupled to an output of the motor, and an output rack and pinion drivingly coupled to the gear train. This output rack is driven in a first linear direction by the motor. A spring return mechanism including a clock spring coupled to the gear train is also included. The clock spring is wound upon energization of the motor driving the output pinion in a first rotary direction, which in turn drives the output rack in the first linear direction, and unwinds upon motor de-energization to drive the output pinion through the drive train in a second rotary direction to drive the output rack in a second linear direction. A manual override mechanism having a first user accessible interface is provided that operates in conjunction with the spring return mechanism to allow manual positioning of the output rack and winding of the clock spring. Finally, a manual locking mechanism having a second user accessible interface is also provided. This manual locking mechanism engages the gear train to prevent rotation of the output pinion in the second direction to thereby prevent linear translation of the output rack in the second direction.

In one embodiment the manual locking mechanism includes a segment gear head having a toothed portion on its face, and is rotatable between a locked position wherein the toothed portion engages the gear train preventing rotation of the output coupling in the second direction, and an unlocked position wherein the toothed portion is disengaged from the gear train. The manual locking mechanism further includes a reset lock spring operatively coupled to the segment gear head to bias the segment gear head to the unlocked position. Additionally, the segment gear head includes a slot adapted to accommodate a stop pin, which abuts against a first end of the slot in the locked position to prevent further rotation of the segment gear head. Further, rotation of the gear train at a point of engagement with the locking mechanism under influence of the clock spring is in a direction to rotate the segment gear head against the reset lock spring force thereby maintaining the manual locking mechanism in the locked position. Rotation of the gear train at a point of engagement with the locking mechanism under influence of the motor is in a direction to rotate the segment gear head in accord with the reset lock spring force thereby aiding the manual locking mechanism to achieve the unlocked position. Preferably, the motor kicks the output pinion in the first direction to disengage the locking mechanism from the gear train to allow rotation of the output pinion in the second direction and linear translation of the output rack in the second direction.

Other features and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
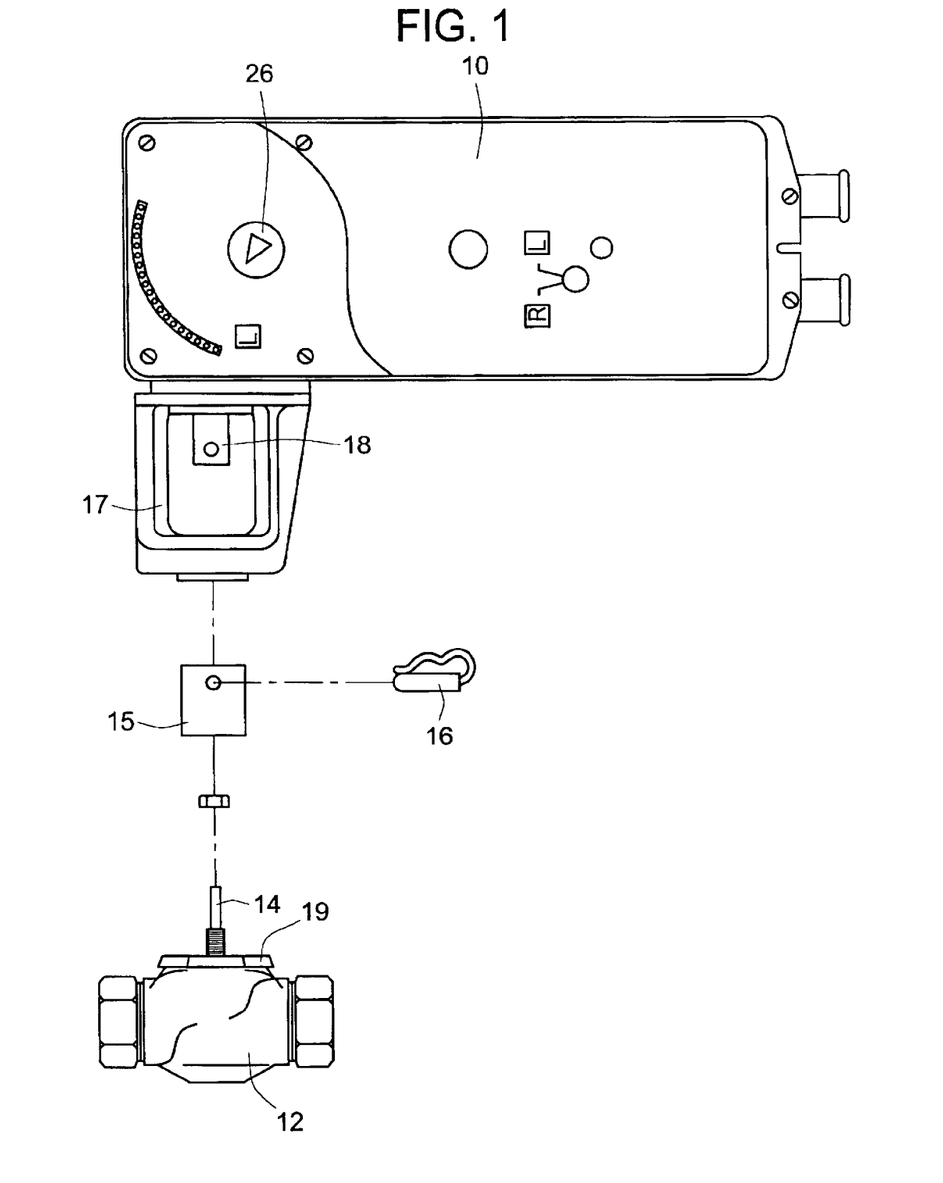
FIG. 1 is an exploded isometric view of a spring return linear actuator constructed in accordance with the teachings of the present invention for installation on a flow control valve.

As illustrated in FIG. 1, an embodiment of the present invention is embodied in a reversible linear actuator 10 for controlling the position of a utilization device 12. In this exemplary embodiment, the utilization device 12 has been shown as being a flow control valve 12. The valve is closed and opened by linearly translating a valve stem 14 in and out relative to the valve body 12, respectively. A stem extension 15 may be used to couple the valve stem 14 to the output rack 18 of the linear actuator 10. In one embodiment, the extension 15 is coupled to the rack 18 via connecting pin 16. In a preferred embodiment, the linear actuator 10 includes a mounting bracket 17 that mates with a mounting nut 19 of the valve body 12.

Figure 2:
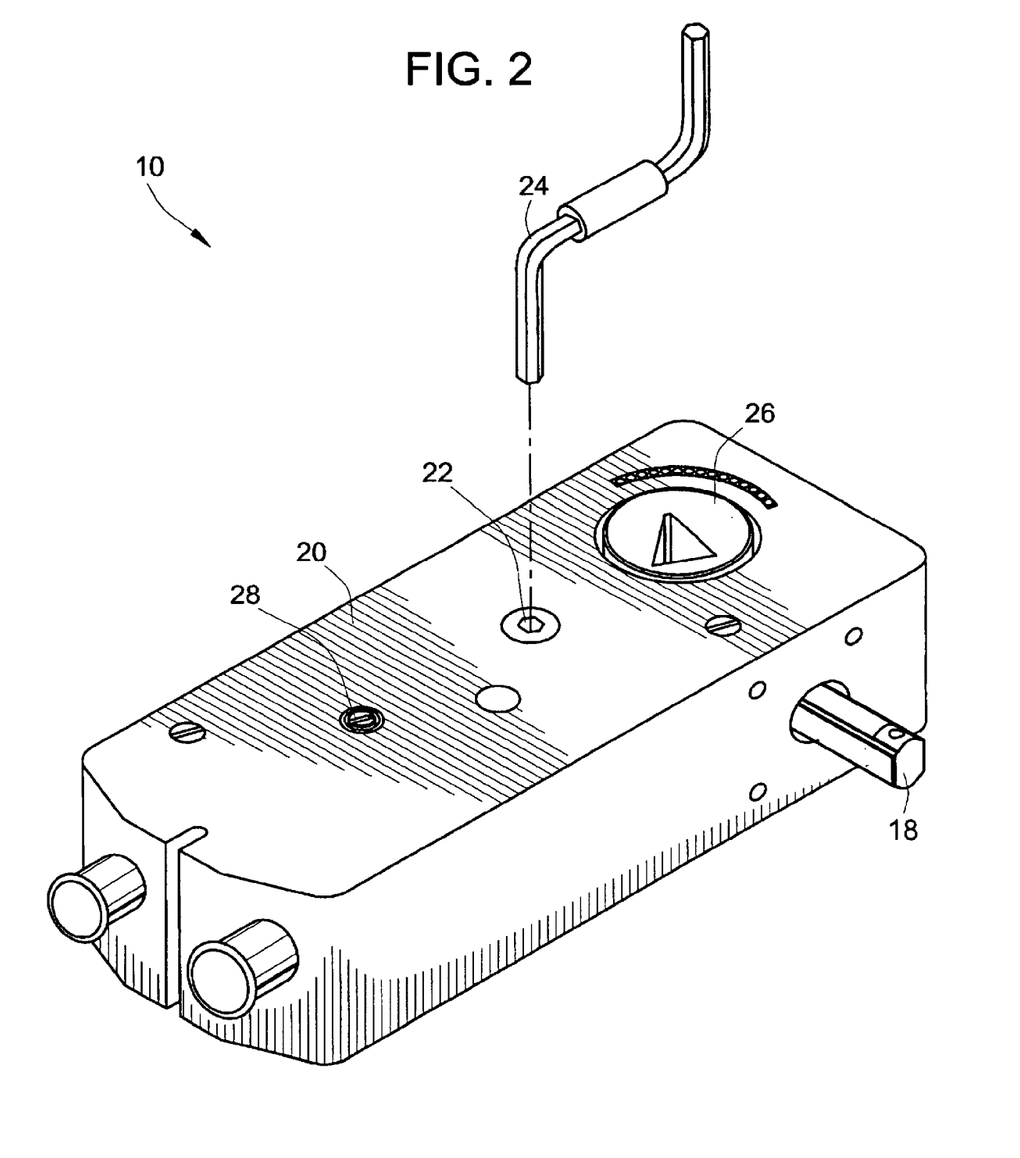
FIG. 2 is a simplified perspective view of the actuator of FIG. 1 enlarged to show detail of the interface for the manual override and locking mechanisms of the present invention.

As may be seen from the enlarged view of the actuator 10 of the present invention illustrated in FIG. 2, the housing 20 of the actuator 10 includes a manual override interface 22 adapted to receive a manual override crank tool 24. Through the use of this tool, a user may wind the clock spring that returns the output rack 18, driven by the pinion gear 26, of the actuator 10 to its zero position once power is removed from the motor. As discussed above, winding the clock spring stores energy in the spring that may be applied as a preload once the valve stem 14 (see FIG. 1) is coupled to the output rack 18. Once the preload has been applied to the spring, the user may manually lock the actuator 10 via interface 28 to prevent the spring from returning to its quiescent state. Once locked in place, the valve stem 14 is placed in its zero position and it is coupled to the output rack 18 of the actuator 10, preferably through a stem extension 15 illustrated in FIG. 1. The user may then unlock the actuator 10 by moving the locking interface 28 to its unlocked position, or may simply allow the automatic control of the actuator to unlock the lock during operation as will be discussed more fully below.

Figure 3:
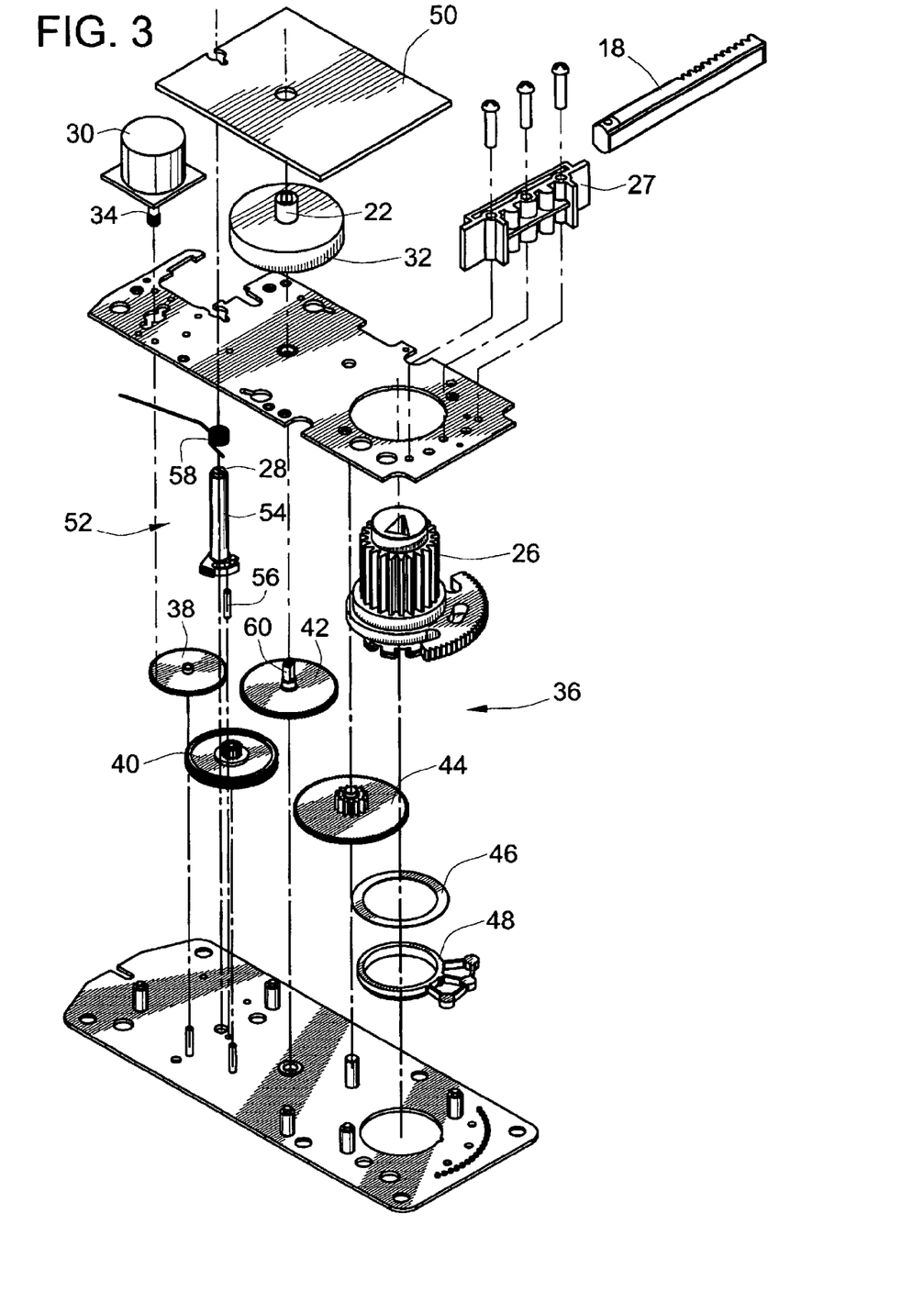
FIG. 3 is a simplified exploded perspective view of the interior of an actuator constructed in accordance with the teachings of the present invention.

As discussed above with reference to FIG. 1, the actuator 10 includes a housing 20 secured to the valve body 12 via mounting bracket 17, and having its output rack 18 linearly, drivably coupled to the valve stem 14. In one embodiment, driving the output pinion gear 26 in a counterclockwise direction effectuates a linear translation of the output rack 18 to withdraw it relative to the valve stem 14 to open or close the valve 12. In other embodiments, the withdraw of the rack 18 may effectuate a closure of the valve 12. This is effected by a relatively low torque and selectively energizable electric motor 30 located in the housing 20 as illustrated in FIG. 3 to which specific reference is now made. As the pinion gear 26 is rotated counterclockwise, a clock spring 32 is loaded or wound. This spring 32 serves to rotate the pinion gear 26 in a clockwise direction in order to extend the output rack 18 to close the valve 12 when the motor 20 is de-energized. The placement of the spring 32 within the gear train not only optimizes the torque multiplication of the spring force to return the rack 18 to its zero or fail-safe condition, but also greatly reduces the torque required to apply the manual preload.

The motor 30 includes a drive shaft 34 and, as mentioned above, is of relatively low torque. The drive shaft 34 of the motor is connected to the output pinion 26 by a drive or gear train 36, which causes the output pinion 26 to rotate at a substantially slower speed than the motor drive shaft 34 and to be capable of exerting substantially higher torque than the motor drive shaft 34. This results in the linear translation of the output rack 18 at a slow speed and with a substantially higher force than could be exerted by directly driving the output pinion 26 by the motor shaft 34 directly. The rack 18 is held in relative translatable position to the output pinion 26 by bracket 27.

Figure 4:
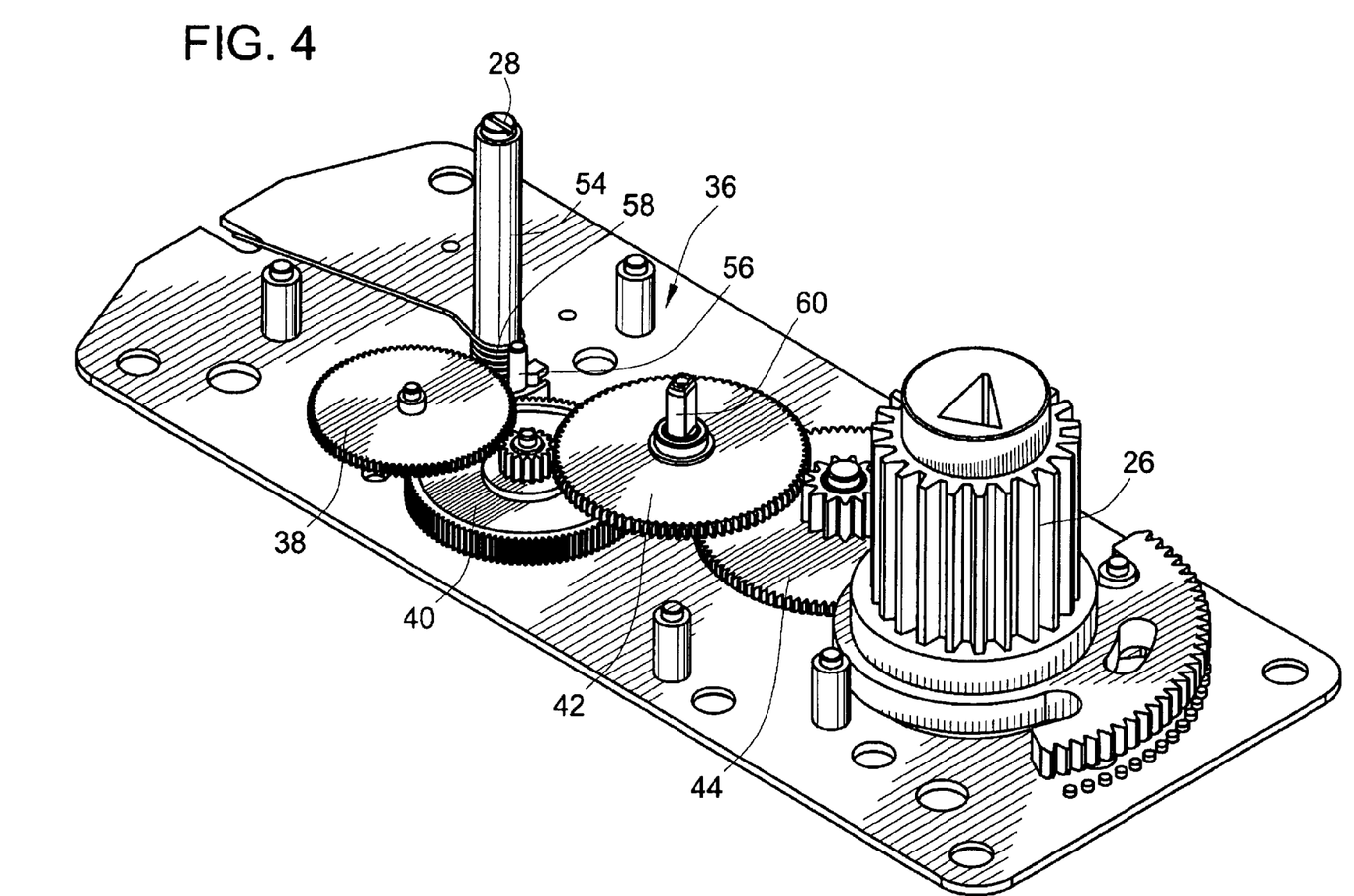
FIG. 4 is a perspective view of the gear train assembly of the actuator of FIG. 3.

In this embodiment, the gear train 36 includes four gears and pinions 38–44 in driving relationship with one another to multiply the torque from the motor while substantially reducing the speed at which the output pinion 26 is driven. A small thrust washer 46 and an output bearing 48 are also included in relation to the output pinion 26. The drive train in its assembled form is illustrated in FIG. 4, which more clearly shows the relationship between the individual gears.

To explain the operation of the actuator 10 as described thus far, assume that the valve 12 is in its closed or zero position and that the motor 30 is de-energized. Now assume that a control signal from controller board 50 causes the motor 30 to be energized so as to effect rotation of the motor drive shaft 34. That shaft acts through the gear train 36 to rotate the output pinion 26, which linearly translates the output rack 18 to extend or withdraw the valve stem 14 relative to the valve body 12 to reposition the valve. At the same time, this rotation winds the clock spring 32. The valve 12 repositions until it reaches it fully open or closed position, at which time the motor remains energized but goes to a holding condition. In this way the valve 12 is held at its fully open or closed position by the motor against the force of the spring 32.

Now assume that the motor 30 is de-energized, either by a control signal from the controller board 50 or by loss of electrical power during operation. Upon de-energization of the motor 30, the clock spring 32 unwinds and rotates the output pinion 26 in a reverse direction, which linearly translates (retracts) the output rack 18 to place the valve 12 in a known fail-safe state (closed or open). In the embodiment illustrated, the clock spring 32 operates to close the valve 12. When the valve 12 closes fully at its zero position, the spring continues to apply the preload force through the gear train 36, which ensures a positive closing force continues to be applied on the valve stem 14 of the valve 12.

As discussed above, the application of the preload on the spring 32 is accomplished via the manual override interface 22. It should be noted that this manual override may also be used to position or open the valve 12 manually in the event of a loss of power. In either event, whether the manual override is employed to impart a preload force into the spring 32 or to position or open the valve 12 manually, the normal functionality of the spring 32 and the gear train 36 that wants to return the valve to its zero position can be locked out via the locking mechanism 52.

This locking mechanism 52 also operates in conjunction with the gear train 36 to prevent the spring 32 from returning the valve to its zero position. As may be seen most clearly from FIG. 3, the locking mechanism 52 includes reset lock member 54, a stop pin 56, and a reset lock spring 58. As shown in FIG. 4, the locking mechanism 52 operates in conjunction with the gear train at a point such that the breaking force applied is multiplied through the gear train to prevent rotation of the output pinion 26. Preferably, the location of the locking mechanism is upstream of the interface 60 between the gear train and the spring 32, a position of higher speed and lower torque rotation.

Figure 5:
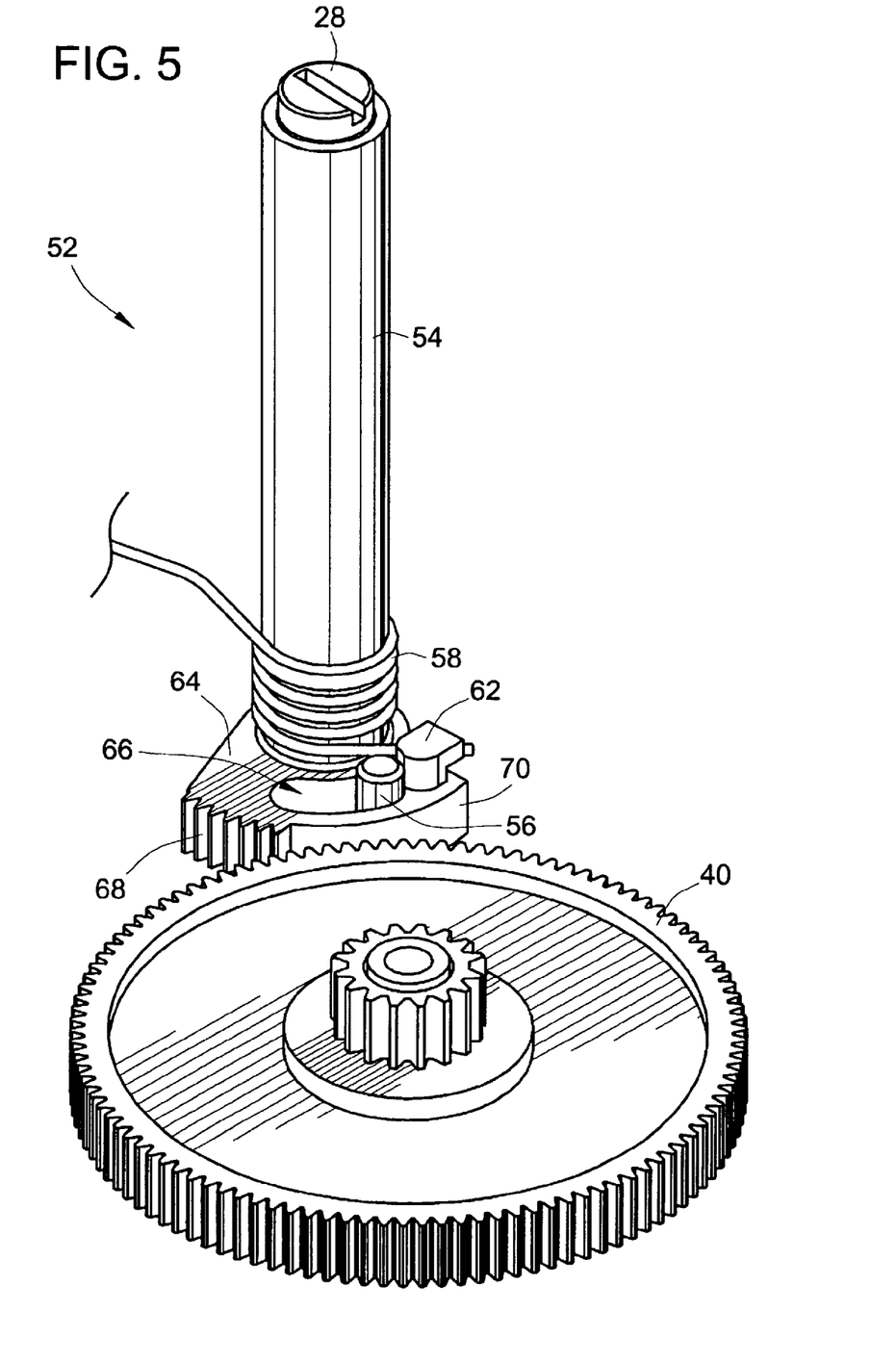
FIG. 5 is an isolated perspective view of an embodiment of the locking mechanism of the present invention in an unlocked position.
Figure 6:
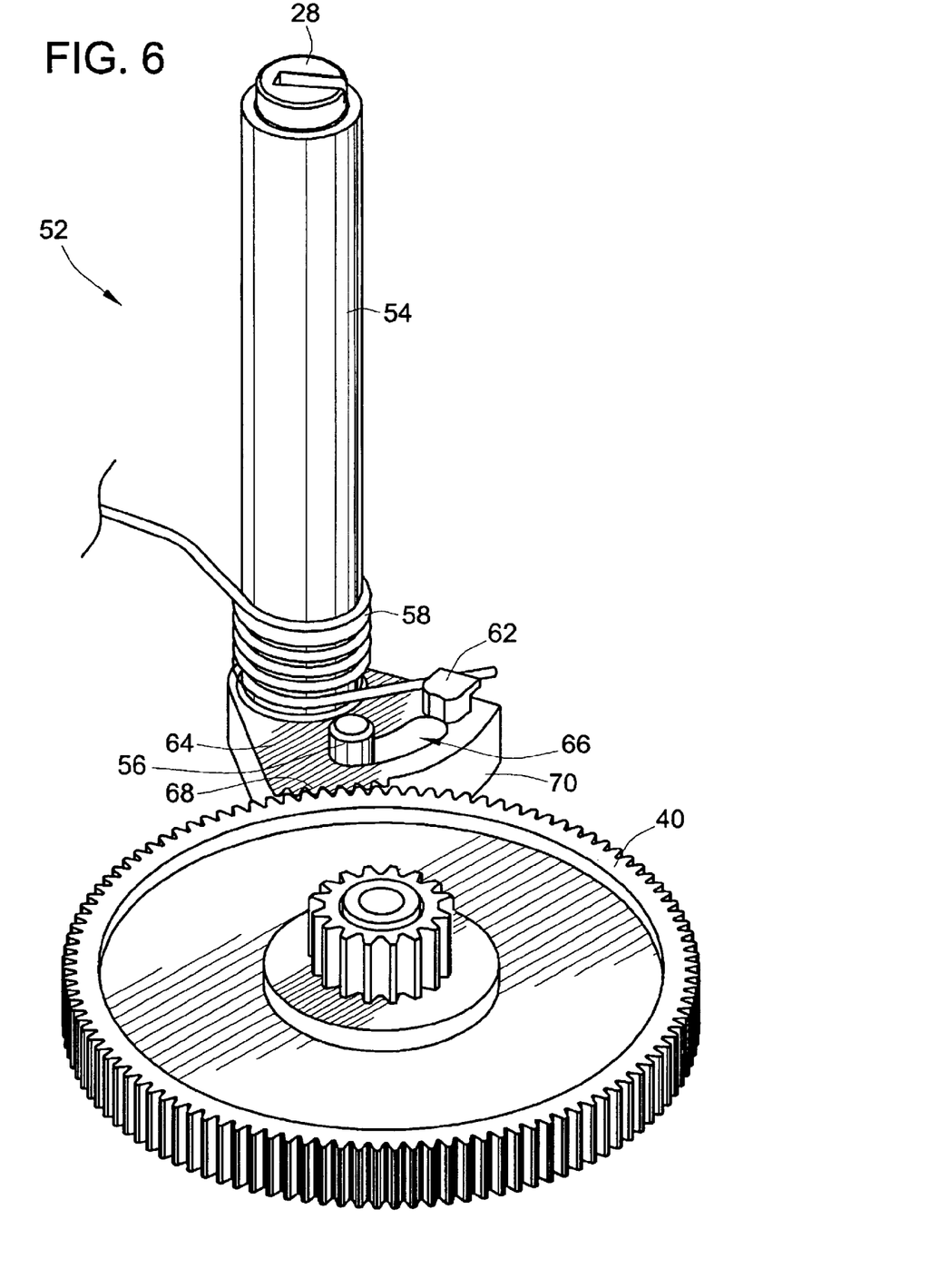
FIG. 6 is an isolated perspective view of the locking mechanism of FIG. 5 in a locked position.

The operation of the locking mechanism 52 may best be understood through an examination of FIGS. 5 and 6. In FIG. 5 the locking mechanism 52 is illustrated in its quiescent unlocked position. In this position the reset lock spring 58 applies a force on the spring receiver 62. This force biases the segment gear head 64 in a clockwise direction such that it is rotated until stop pin 56 contacts the end of the slot 66. The face of the segment gear head 64 includes a toothed portion 68 and a smooth portion 70. In one embodiment, the toothed portion 68 occupies approximately 25°, although this may be varied depending on the tooth pattern and spacing of the gear 40 which the toothed portion 68 engages. That is, a number of teeth sufficient to hold the gear against the force applied by the spring 32 must be provided. In the unlocked position illustrated in FIG. 5, the reset lock spring 58 maintains the smooth portion 70 in association with the gear 40 so that this gear 40 may freely rotate in either direction. In the embodiment illustrated, rotation of the gear 40 in a counterclockwise direction relates to the extending of the rack 18, which rotation of the gear 40 in a clockwise direction retracts the rack 18. It is noted that such clockwise rotation of gear 40 results from action of the spring 32 to retract the rack 18 upon a loss of power.

In FIG. 6, the locking mechanism 52 is illustrated in its locked position. In this locked position, rotation of the gear 40 in the clockwise direction is prevented by the stop pin 56, which has contacted the end of slot 66. This locked position is held by the force of the spring 32 acting through the gear train against the force of the reset lock spring 58, which is biased to rotate toothed portion 68 of the segment gear head 64 out of engagement with gear 40. Since gear 40 is prevented from further clockwise rotation under force of the spring 32, this locks the rest of the gear train 36 and prevents rotation of the output pinion 26 and linear translation of the output rack 18. As such, the valve 12 is prevented from closing or opening under force of the spring 32. In the initial installation of the actuator 10, this locking of the output pinion 26 and output rack 18 is used once a preload is manually added to the spring 32 via interface 22 shown in FIG. 2. Once the preload is applied and the output pinion 26 and rack 18 are locked, the valve stem 14 of the valve 12 is coupled to the output rack 18 of the actuator 10 with the valve stem 14 positioned at its zero position within the valve 12 as discussed above with regard to FIG. 1.

Once the locking mechanism 52 has been engaged, it may be disengaged manually by using the tool 24 to rotate the interface 22 in the direction to wind the spring 32. In the embodiment illustrated, the user need rotate the interface 22 by an amount sufficient to rotate the gear 40 approximately 10° minimum to disengage the lock. Once this occurs, the reset lock spring 58 will bias the segment gear head in the clockwise direction until the stop pin 56 contacts the end of the slot 66 as illustrated in FIG. 5. Once the locking mechanism 52 is disengaged, the gear train 36 is free to rotate in either direction to open the valve 12 under control of the motor 30 and to close the valve 12 under control of the spring 32.

Alternatively, the locking mechanism 52 may be disengaged automatically under control of the control board 50 and the motor 30. That is, if the control board 50 wishes to unlock the locking mechanism 52 or wishes to command a closure of the valve 12, it controls the motor 30 to kick in a drive direction, i.e. drive the output pinion 26 and rack 18 in a direction to open the valve 12, just enough to ensure that the gear 40 rotates counterclockwise an amount sufficient to disengage the toothed portion 68 of the segment gear head 64. As discussed above, once the toothed portion 68 disengages the gear 40, the reset lock spring 58 will bias the locking mechanism 52 into its unlocked position. Since the position of the locking mechanism 52 in relation to the gear train 36 is nearer the motor 30, and thus nearer the high speed low torque portion of the gear train 36, this slight rotation of the gear train 36 sufficient to unlock the locking mechanism 52, does not impart any significant movement on the valve stem 14 of the valve 12. Indeed, even if the valve 12 were in its fully open position when the locking mechanism 52 was engaged, the motor 30 would be able to unlock the locking mechanism 52.

All of the references cited herein, including patents, patent applications, and publications, are hereby incorporated in their entireties by reference.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. Indeed, while the above description utilized a spring-return actuator to illustrate the features of the invention, one skilled in the art will recognize that the manual override and locking mechanism are equally applicable to non-spring return actuators as well. In such an application, the manual override is used to manually position the damper as opposed to winding a spring. All such modifications and variations are within the scope of the invention as determined by the appended claims when interpreted in accordance with the breadth to which they are fairly, legally, and equitably entitled.

What is claimed is:

1. A linear actuator, comprising:
   a motor;
   a gear train;
   an output pinion driven by the motor through the gear train, the gear train multiplying the torque of the motor to drive the output pinion;
   an output rack drivably coupled to the output pinion to translate rotation of the output pinion to linear translation of the output rack;
   a manual override mechanism having a first user accessible interface, the manual override mechanism operating in conjunction with the gear train to allow manual positioning of the output pinion and of the output rack; and
   a manual locking mechanism having a second user accessible interface, the manual locking mechanism engaging the gear train to prevent rotation of the output pinion in a first rotary direction and to prevent linear translation of the output rack in a first linear direction.

2. The actuator of claim 1, further comprising a spring return mechanism including a clock spring coupled to the gear train, the clock spring being wound upon energization of the motor driving the output pinion in a rotary second direction and the rack in a second linear direction, the clock spring unwinding upon de-energization of the motor to drive the output pinion through a portion of the drive train in the first rotary direction to drive the output rack in the first linear direction.

3. The actuator of claim 2, wherein the manual override mechanism is coupled through the clock spring such that operation of the manual override to effect a rotation of the output pinion in the second rotary direction and to effect a linear translation of the output rack in the second linear direction winds the clock spring.

4. The actuator of claim 2, wherein the manual locking mechanism includes a segment gear head having a toothed portion and a smooth portion on a face thereof, the segment gear head being rotatable between a locked position wherein the toothed portion engages the gear train preventing rotation of the output pinion in the first rotary direction and linear translation of the output rack in the first linear direction, and an unlocked position wherein the smooth portion is positioned in association with the gear train and the toothed portion is disengaged from the gear train.

5. The actuator of claim 4, wherein the manual locking mechanism further includes a reset lock spring operatively coupled to the segment gear head to bias the segment gear head to the unlocked position.

6. The actuator of claim 5, wherein the segment gear head includes a slot adapted to accommodate a stop pin therethrough, the stop pin abutting against a first end of the slot in the unlocked position and abutting against a second end of the slot in the locked position.

7. The actuator of claim 5, wherein rotation at a point of engagement with the locking mechanism of the gear train under influence of the clock spring is in a direction to rotate the segment gear head against the reset lock spring force thereby maintaining the manual locking mechanism in the locked position.

8. The actuator of claim 5, wherein rotation at a point of engagement with the locking mechanism of the gear train under influence of the motor is in a direction to rotate the segment gear head in accord with the reset lock spring force thereby aiding the manual locking mechanism to achieve the unlocked position.

9. The actuator of claim 1, wherein the motor drives the output pinion in a second rotary direction and the output rack in a second linear direction to disengage the locking mechanism from the gear train to allow rotation of the output pinion in the first rotary direction and linear translation of the output rack in the first linear direction.

10. A locking mechanism for a motor driven linear actuator comprising:
    a motor;
    a gear train;
    an output pinion driven by the motor through the gear train;
    an output rack drivably coupled to the output pinion to translate rotation of the output pinion to linear translation of the output rack;
    a segment gear head having a toothed portion and a smooth portion on a face thereof, the toothed portion configured to engage a gear in the gear train, the segment gear head being positioned in relation to the gear such that rotation of the segment gear head between a locked position and an unlocked position results in engagement of the toothed portion with the gear in the locked position and disengagement of the toothed portion in the unlocked position, the segment gear head further defining a slot therethrough adapted to accommodate a stop pin therein, the slot being positioned in the segment gear head such that the stop pin abuts against a first end of the slot in the unlocked position and against a second end of the slot in the locked position;
    a reset lock spring operably coupled to the segment gear head to bias the segment gear head to the unlocked position; and
    a user interface coupled to the segment gear head to rotate the segment gear head between the locked and the unlocked positions.

11. The locking mechanism of claim 10, wherein the toothed portion of the segment gear head occupies approximately 25°.

12. The locking mechanism of claim 10, wherein the toothed portion is positioned in relation to the slot such that rotation of the gear train at a point of engagement with the locking mechanism is in a direction to rotate the segment gear head such that the stop pin engages the second end.

13. The locking mechanism of claim 10, wherein the reset lock spring is positioned such that engagement of the toothed portion of the segment gear head with the gear train when the actuator is driving the device to a closed position results in rotation of the segment gear head against the bias applied by the reset lock spring.

14. A spring return, motor driven linear actuator for driving a flow control device to an actuated position under power and to a fail-safe position upon loss of power, the actuator comprising:
    a motor;
    a speed reducing, torque multiplying gear train drivingly coupled to an output of the motor;

an output pinion drivingly coupled to the gear train, the output pinion being driven in a first rotary direction by the motor;

an output rack drivingly coupled to the output pinion, the output rack being driven in a first linear direction by the output pinion under influence of the motor;

a spring return mechanism including a clock spring coupled to the gear train, the clock spring being wound upon energization of the motor driving the output pinion in the first rotary direction, the clock spring unwinding upon motor de-energization to drive the output pinion through the drive train in a second rotary direction to thereby linearly translate the output rack in a second linear direction;

a manual override mechanism having a first user accessible interface, the manual override mechanism operating in conjunction with the spring return mechanism to allow manual positioning of the output pinion and of the output rack, and winding of the clock spring; and a manual locking mechanism having a second user accessible interface, the manual locking mechanism engaging the gear train to prevent rotation of the output pinion in the second rotary direction and to prevent linear translation of the output rack in the second linear direction.

15. The actuator of claim 14, wherein the manual locking mechanism includes a segment gear head having a toothed portion on a face thereof, the segment gear head being rotatable between a locked position wherein the toothed portion engages the gear train preventing rotation of the output pinion in the second rotary direction and linear translation of the output rack in the second linear direction, and an unlocked position wherein the toothed portion is disengaged from the gear train.

16. The actuator of claim 15, wherein the manual locking mechanism further includes a reset lock spring operatively coupled to the segment gear head to bias the segment gear head to the unlocked position.

17. The actuator of claim 16, wherein the segment gear head includes a slot adapted to accommodate a stop pin therethrough, the stop pin abutting against a first end of the slot in the locked position thereby preventing further rotation of the segment gear head.

18. The actuator of claim 16, wherein rotation of the gear train at a point of engagement with the locking mechanism under influence of the clock spring is in a direction to rotate the segment gear head against the reset lock spring force thereby maintaining the manual locking mechanism in the locked position.

19. The actuator of claim 16, wherein rotation of the gear train at a point of engagement with the locking mechanism under influence of the motor is in a direction to rotate the segment gear head in accord with the reset lock spring force thereby aiding the manual locking mechanism to achieve the unlocked position.

20. The actuator of claim 14, wherein the motor kicks the output pinion in the first rotary direction to disengage the locking mechanism from the gear train to allow rotation of the output pinion in the second rotary direction and linear translation of the output rack in the second linear direction.

* * * * *